United States Patent [19]
Palmer

[11] Patent Number: 5,857,599
[45] Date of Patent: Jan. 12, 1999

[54] MOUNTING BRACKET ASSEMBLY FOR A NIGHT VISION DEVICE

[75] Inventor: Gary L. Palmer, Vinton, Va.

[73] Assignee: ITT Manufacturing Enterprises, Icnc., Wilmington, Del.

[21] Appl. No.: 788,742

[22] Filed: Jan. 24, 1997

[51] Int. Cl.⁶ .................................................. G02B 23/16
[52] U.S. Cl. ............................ 224/181; 224/271; 2/422; 359/815
[58] Field of Search .................................. 224/181, 271, 224/272, 930, 908, 909; 359/815, 409, 896; 362/105, 106; 2/209.13, 422, 6.2, 6.5, 6.7

[56] References Cited

U.S. PATENT DOCUMENTS

| | | | |
|---|---|---|---|
| 2,710,609 | 6/1955 | Giller | 224/181 X |
| 4,449,787 | 5/1984 | Burbo, et al. . | |
| 5,307,204 | 4/1994 | Dor | 539/896 X |
| 5,331,684 | 7/1994 | Baril, et al. . | |
| 5,381,263 | 1/1995 | Nowak et al. | 539/409 X |
| 5,495,364 | 2/1996 | Palmer . | |
| 5,537,261 | 7/1996 | Palmer . | |

*Primary Examiner*—Renee S. Luebke
*Attorney, Agent, or Firm*—Plevy & Associates

[57] ABSTRACT

A mounting bracket assembly for mounting a night vision device to a headmount apparatus, made up of an attachment member, a mounting bracket and a hinge. The attachment member attaches the mounting bracket assembly to the headmount. The mounting bracket is generally U-shaped for holding a night vision device. The mounting bracket includes a coupling pad disposed at an end of the mounting bracket for receiving a coupling member attached to the night vision device, and a spring clip attached to the coupling pad for locking the coupling member of the night vision device to the coupling pad. The hinge couples the mounting bracket to the attachment member, and includes a pivot mechanism for allowing articulated movement of the mounting bracket relative to the attachment member.

19 Claims, 7 Drawing Sheets

MOUNTING BRACKET ASSEMBLY FOR A NIGHT VISION DEVICE

FIELD OF THE INVENTION

The present invention relates generally to the field of night vision and more particularly to a mounting bracket assembly for detachably mounting a night vision device to a headmount assembly.

BACKGROUND OF THE INVENTION

Night vision goggles, binoculars, and like devices are utilized in a variety of military and commercial applications where enhanced vision during low light or night conditions is desirable. Night vision devices typically utilize an image intensifier tube and associated optics for converting infrared and near infrared light reflected from objects, into viewable images. The United States Army currently uses a night vision goggle assembly referred to as the PVS-7B which is manufactured by ITT Electro-Optical Products Division (DEOP) of Roanoke, Va., the assignee herein. Also manufactured by ITT DEOP is a commercially available night vision binocular assembly referred to as the Night Quest™.

Night vision devices such as the PVS-7B night vision goggle assembly, are typically carried by a user by attaching the device to a headmount apparatus which is worn on the user's head. Such headmount apparatus typically consist of an adjustable headband/strap arrangement and a night vision device mounting bracket assembly. Night vision devices can also be carried by attaching them directly to a standard issue army helmet via a mounting bracket assembly which enables the night vision device to be selectively positioned in and out of the user's field of vision. An example of such a mounting bracket assembly is described in U.S. Pat. No. 4,449,787 to Burbo et al., which discloses a night vision imaging system mounted to a helmet via a helmet mount bracket assembly that is secured to the helmet at a front surface above the position of the eyes of a user. The mounting bracket assembly allows the night vision imaging system to be "flipped-up" away from the eyes of the user and locked in place when the night vision imaging system is not needed and "flipped-down" in front of the eyes of the user and locked in place when the night vision imaging system is needed.

A mounting bracket assembly for a PVS-7B night vision goggle assembly is described in U.S. Pat. No. 5,331,684 to Baril et al. The mounting bracket assembly described therein includes a support member for holding a PVS-7B or like night vision goggle. The support member is pivotally connected to a clamp mechanism which detachably couples the support member to a helmet. The mounting bracket assembly also includes a movable magnet and reed switch arrangement which activates and deactivates the night vision goggle assembly when it is "flipped" in and out of the user's field of vision.

The mounting bracket assemblies described above and in the prior art, do not generally allow the night vision device to be quickly removed from and/or installed thereon and are relatively heavy in weight. This is because these mounting bracket assemblies employ relatively complicated clamping and locking mechanisms for securing the night vision device to the mounting bracket assembly. The complexity of these clamping and locking mechanisms decreases the versatility of the night vision devices and the heavy weight of these mechanisms lead to increased user fatigue.

Accordingly there is a need for an improved night vision device mounting bracket assembly which allows quick removal and installation of the night vision device and has a reduced weight.

SUMMARY OF THE INVENTION

A mounting bracket assembly for mounting a night vision device to a headmount apparatus, comprising an attachment member, a mounting bracket and a hinge. The attachment member attaches the mounting bracket assembly to the headmount. The mounting bracket is generally U-shaped for holding a night vision device. The mounting bracket includes a coupling pad disposed at an end of the mounting bracket for receiving a coupling member attached to the night vision device, and a spring clip attached to the coupling pad for locking the coupling member of the night vision device to the coupling pad. The hinge couples the mounting bracket to the attachment member, and includes pivot means for allowing articulated movement of the mounting bracket relative to the attachment member.

The mounting bracket assembly above is also described in combination with a headmount apparatus and in combination with a headmount assembly and a night vision device.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Figure 1:
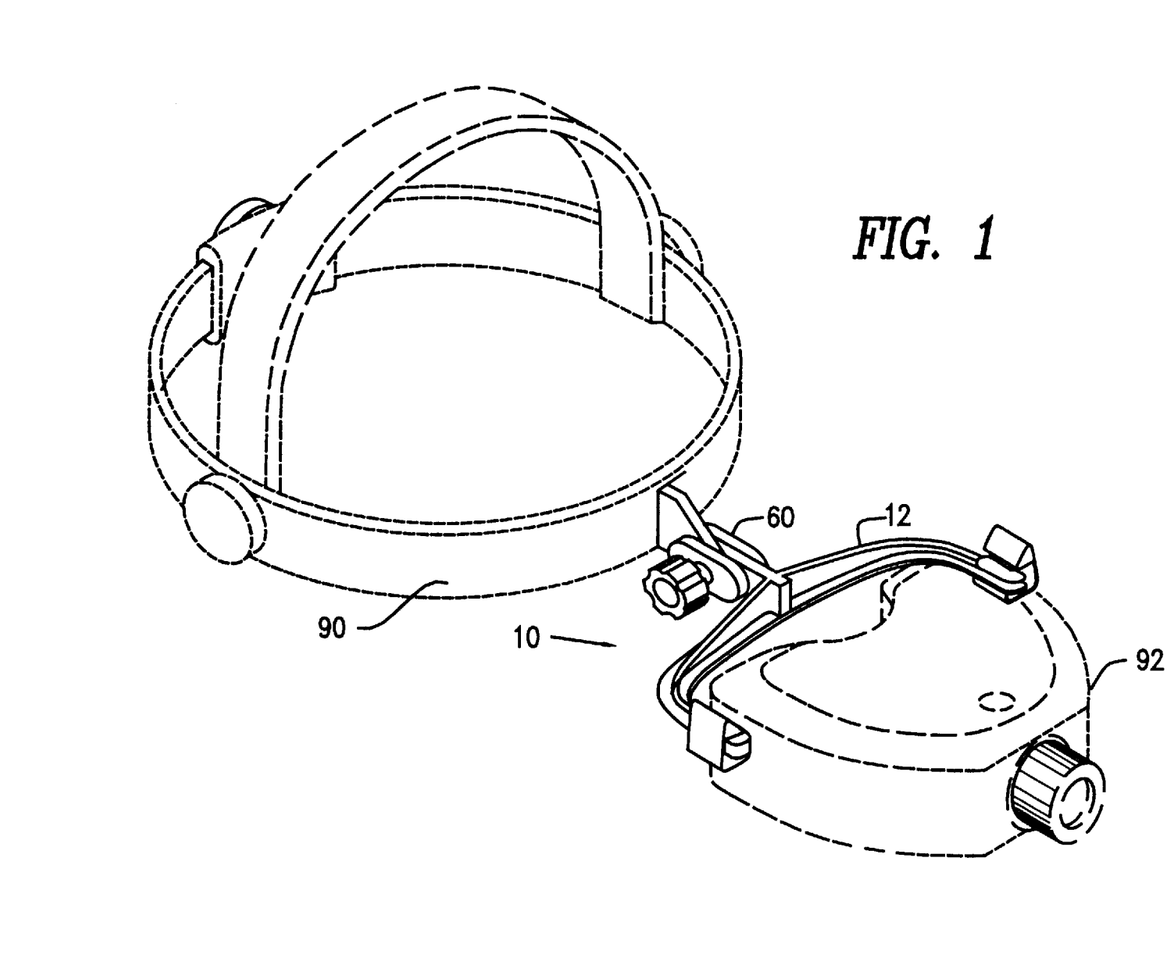
FIG. 1 is perspective view of the mounting bracket assembly of the present invention shown coupled to a headmount apparatus and holding a night vision binocular device.

Referring to FIG. 1, the mounting bracket assembly 10 of the present invention is shown coupled to a conventional headmount apparatus 90 and holding a night vision binocular device 92. Both the headmount apparatus 90 and the night vision binocular device 92 are depicted with broken lines. The headmount apparatus 90 is made up of various straps and buckles which attach over a user's head. The night vision binocular device 92 allows a user to see during low light or night conditions by utilizing an image intensifier tube and associated optics that convert infrared and near infrared light into viewable images. An example of such a night vision binocular device is described in U.S. Pat. No. 5,495,364 entitled NIGHT VISION BINOCULARS issued to Gary L. Palmer on Feb. 27, 1996 (also see U.S. Pat. No. 5,537,261 entitled NIGHT VISION BINOCULARS issued to Gary L. Palmer on Jul. 16, 1996). It should be understood that the mounting bracket assembly 10 of the present invention is not limited to use with the shown headmount apparatus of FIG. 1, and can be used for mounting night vision binocular devices and the like to other types of headgear such as helmets, etc.

As shown in FIG. 1, the mounting bracket assembly 10 generally comprises only two major components: a mounting bracket 12 for holding the night vision binocular device 92 and a locking hinge arrangement 60 coupled to the mounting bracket 12 for allowing articulated motion of the mounting bracket 12 relative to the headmount apparatus 90. Since there are only two major components, the weight of the mounting bracket assembly 10 of the present invention is substantially less than the mounting bracket assemblies of the prior art.

Figure 4A:
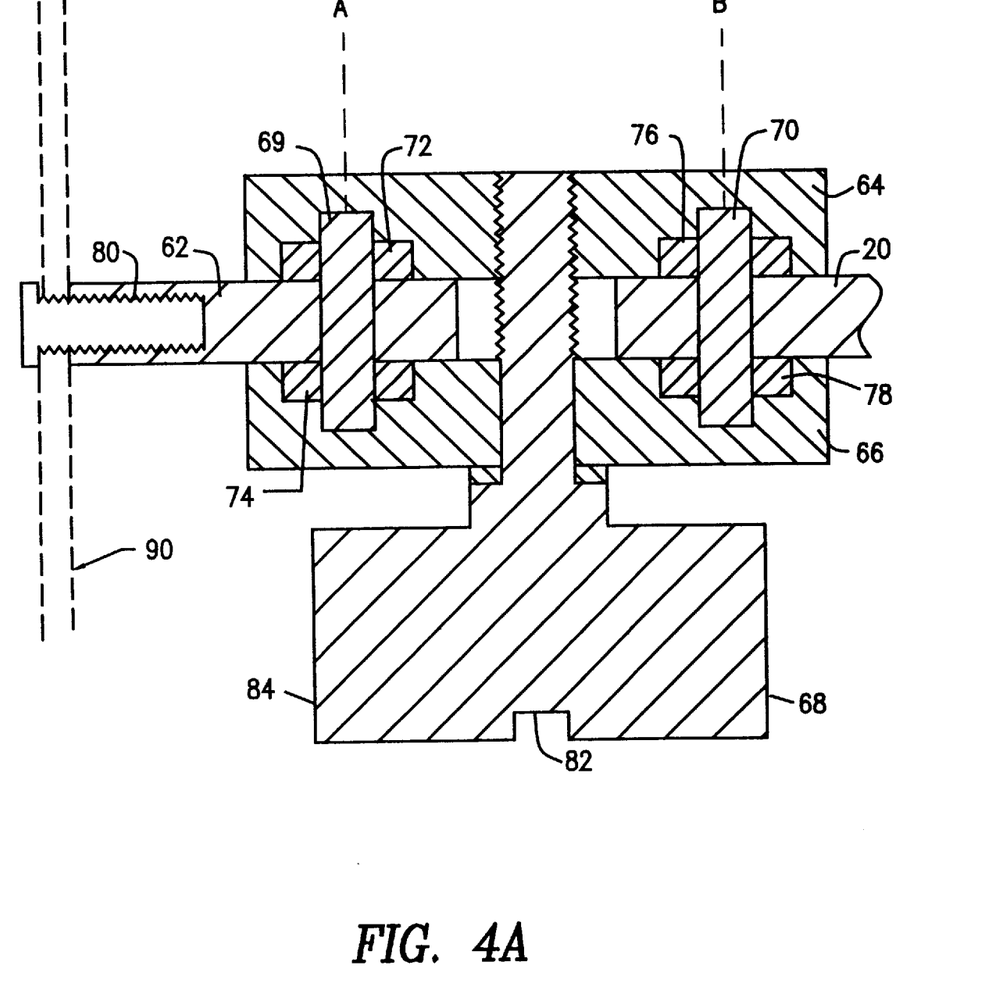
FIG. 4A is a cross sectional view through the lockable hinge arrangement.
Figure 4B:
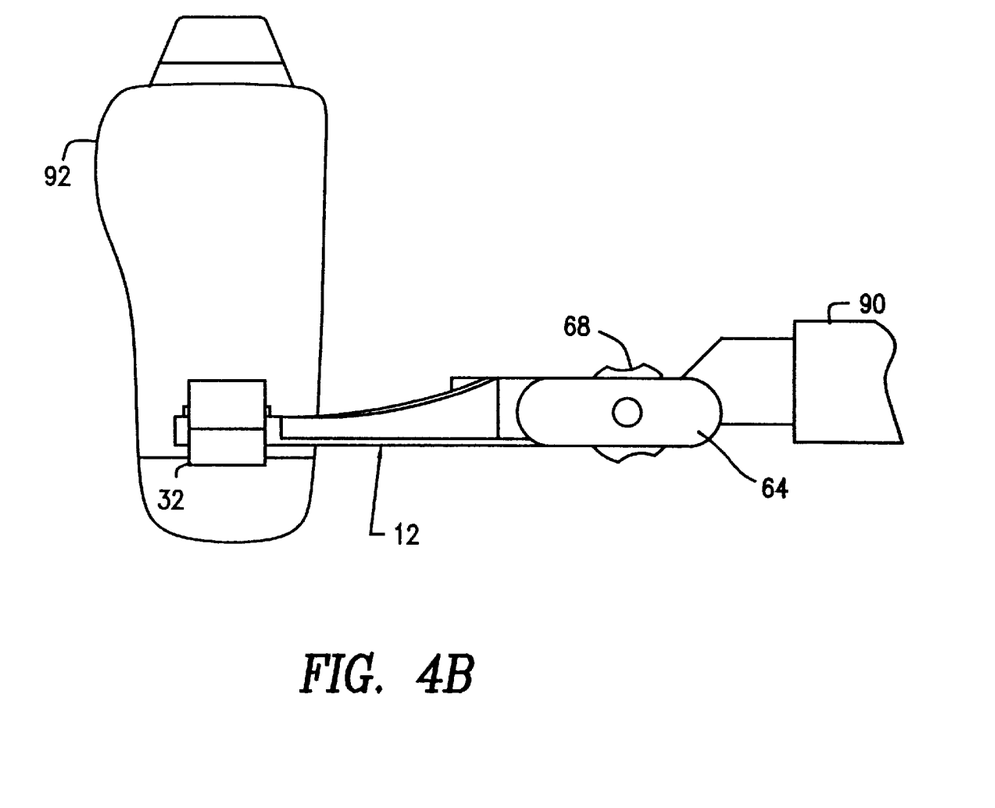
FIGS. 4B–4D are side elevational views which depict how the mounting bracket assembly of the present invention can used to flip the night vision binocular device up and away from a user's face or variably positioned in front of a user's eye.

Referring collectively to FIGS. 2A–2D, the mounting bracket assembly 10 of the present invention is shown separated from the headmount apparatus 90 and the night vision binocular device 92 of FIG. 1. As can be seen, the mounting bracket 12 of the mounting bracket assembly 10 is a generally U-shaped member 14 having a first arm 16 and a second arm 18. The first and second arms 16, 18 each extend from a centrally disposed boss 20 which couples the mounting bracket 12 to the locking hinge arrangement 60. A coupling pad 22, 24 is disposed at the end of each of the first and second arms 16, 18. Each coupling pad 22, 24 defines a seating surface 23, 25 and an elongated key member 26, 28 protruding up therefrom, for receiving a corresponding ring-like coupling ear 94, 96 (FIGS. 4A and 4B) attached to each side of the night vision device as will be later explained. A spring-clip 32, 34 is attached to each coupling pad 22, 24 in order to lock the coupling ears 94, 96 to the coupling pads 22, 24 when the night vision binocular device 92 is attached to the mounting bracket 12 (as shown in FIGS. 4A and 4B). A stiffening web 30 ties the first and second arms 16, 18 together with the coupling pads 22, 24 and the boss 20, to stiffen the mounting bracket 12 thereby preventing the arms 16, 18 of the mounting bracket 12 from twisting or spreading apart when the night vision binocular device 92 is attached thereto.

Figure 2A:
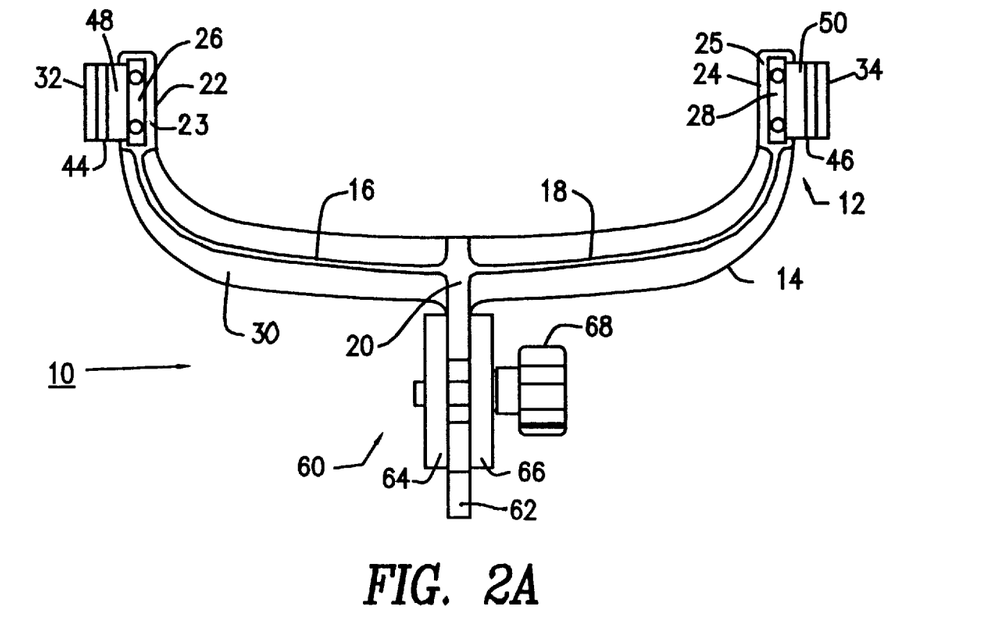
FIG. 2A is a top plan view of the mounting bracket assembly of FIG. 1.
Figure 2B:
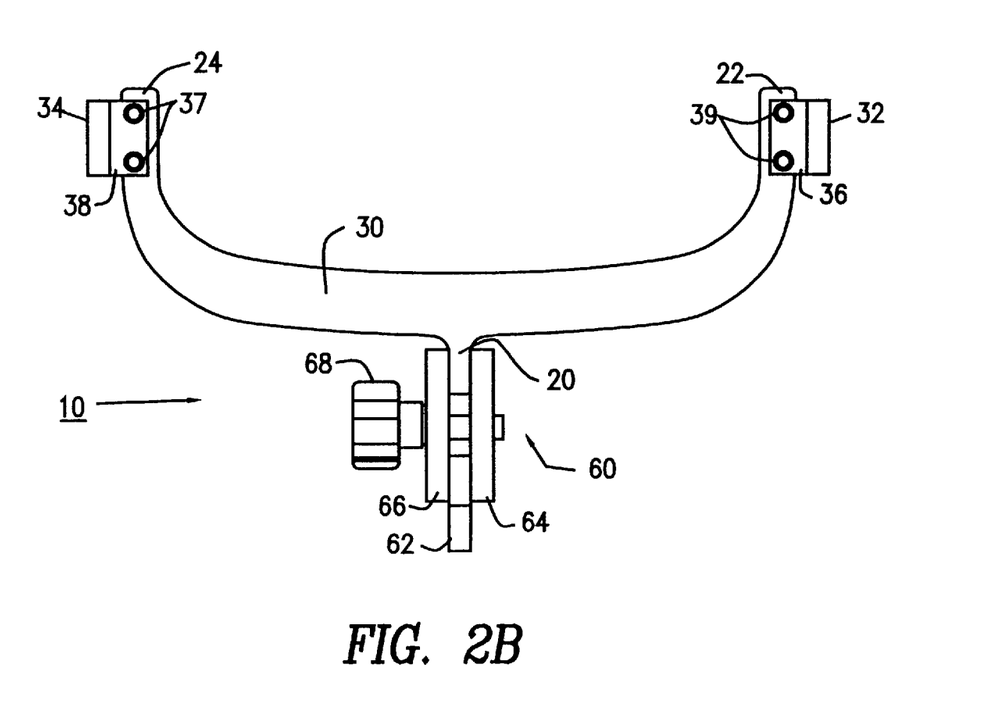
FIG. 2B is a bottom plan view of the mounting bracket assembly of FIG. 1.
Figure 2C:
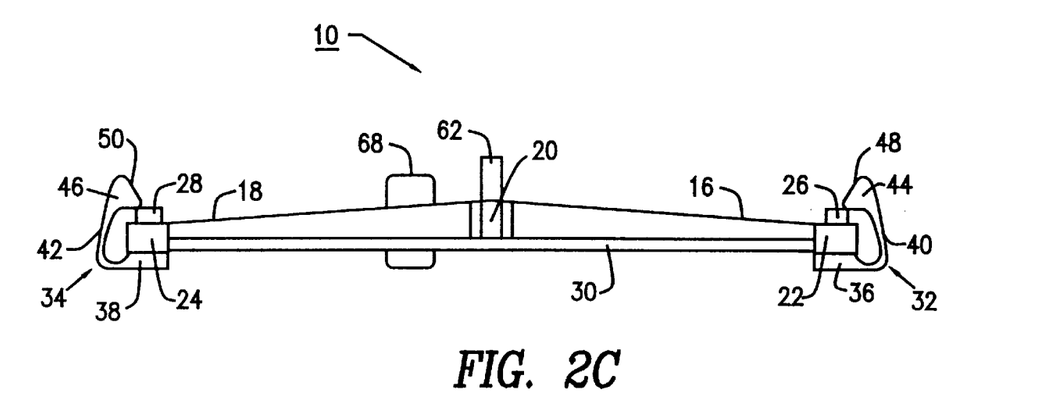
FIG. 2C is a front elevational view of the mounting bracket assembly of FIG. 1.
Figure 2D:
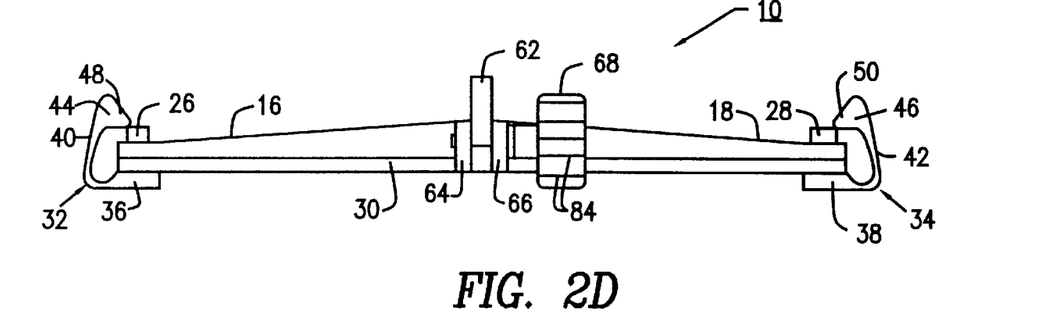
FIGS. 2D is a rear view of the mounting bracket assembly of FIG. 1.

As best seen in FIGS. 2C and 2D, each spring-clip 32, 34 has a generally C-shaped profile defined by an attachment arm 36, 38 which merges into an elastically resilient locking arm 40, 42 that terminates with a triangular-shaped structure 44, 46. The attachment arms 40, 42 rigidly couple the spring-clips 32, 34 to the coupling pads 22, 24 via screw fasteners 37, 39 which are visible in FIG. 2B. The triangular-shaped structures 44, 46 disposed at the end of the spring-clips 32, 34 each define an inclined surface 48, 50. When the spring-clips 32, 34 are at equilibrium, the triangular-shaped structures 44, 46 overlie the seating surfaces 23, 25 of their respective coupling pad 22, 24.

Figure 3A:
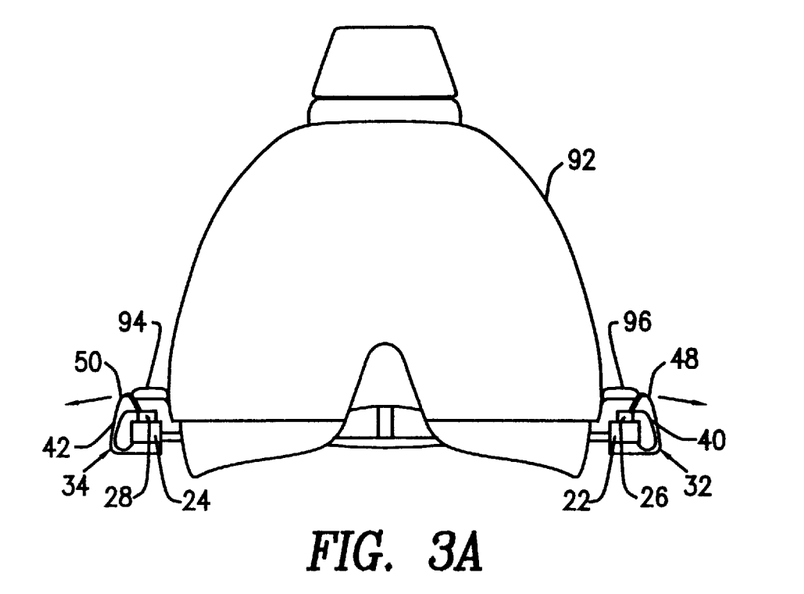
FIGS. 3A and 3B depict the installation of a night vision binocular device to the mounting bracket assembly of the p resent invention.
Figure 3B:
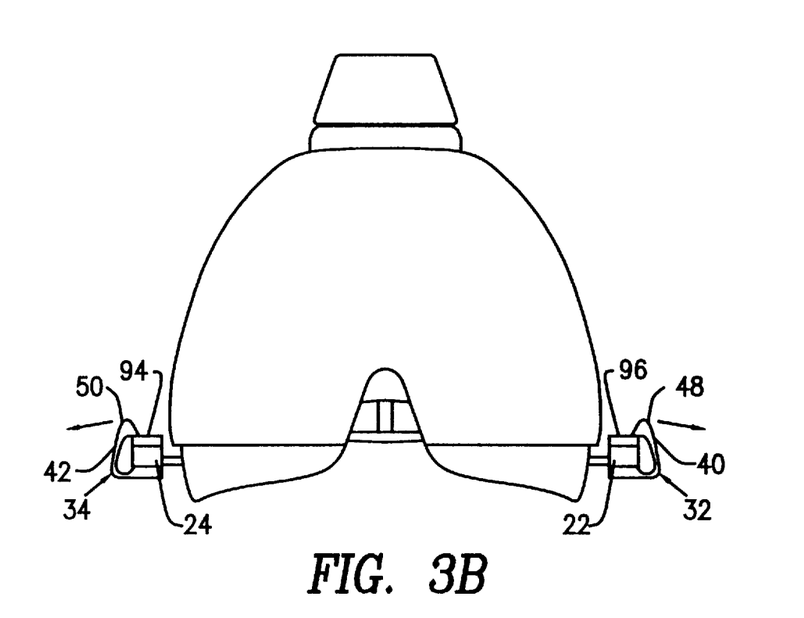
Figure 3C:
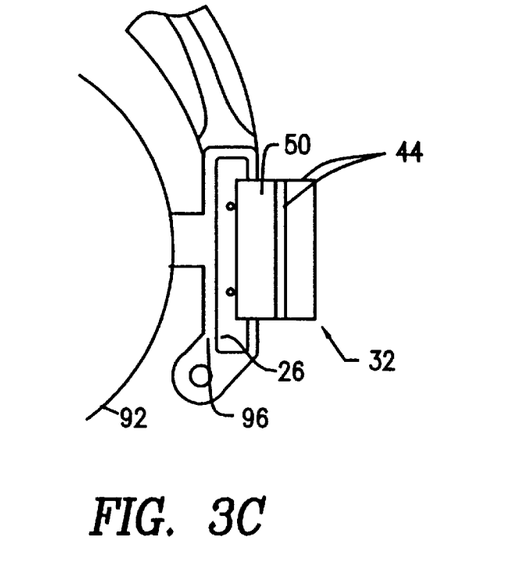
FIG. 3C is am enlarged view which depicts one of the coupling ears of a night vision binocular device seated on a corresponding one of the coupling pads of the mounting bracket assembly.
Figure 4C:
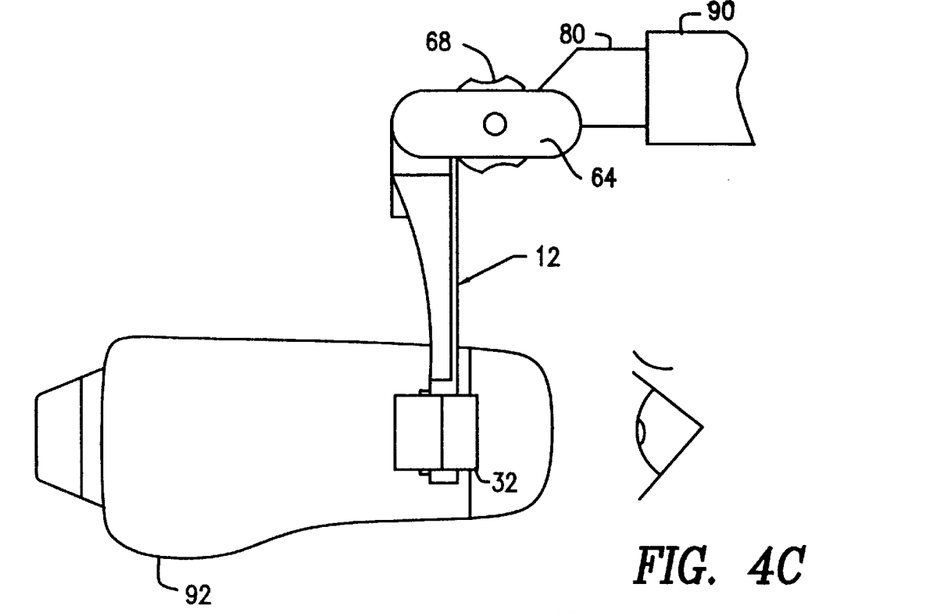

Accordingly, as shown in FIG. 3A, when the night vision binocular device 92 is attached to the mounting bracket assembly 10 of the present invention, the coupling ears 94, 96 on the sides of the night vision binocular device 92 engage the inclined surfaces 48, 50 on the spring-clips and causes the resilient locking arms 40, 42 to deflect thereby spreading the spring-clips 32, 34 open in the direction shown by arrows. More specifically, as the locking arms 40, 42 deflect, the triangular-shaped structures 44, 46 of the spring-clips 32, 34, overlying the coupling pads, move laterally in the direction of the arrows thereby uncovering the coupling pads 22, 24 disposed directly below the triangular-shaped structures 44, 46. As this occurs, the coupling ears 94, 96 on the night vision binocular device 92, slide down the inclined surfaces 48, 50 of the spring-clips 32, 34 to engage the seating surfaces 23, 25 and surround the key members 26, 28 of the coupling pads 22, 24. Just as the coupling ears 94, 96 are seating themselves on the coupling pads 22, 24, the locking arms 40, 42 of the spring-clips spring back and reorient the triangular-shaped structures 44, 46 over the coupling ears 94, 96 seated on the coupling pads 22, 24 as shown in FIGS. 4B and 4C. To detach the night vision binocular device 92 from the mounting bracket assembly 10, pressure is applied to the inclined surfaces 48, 50 to deflect the locking arms 40, 42 of the spring-clips 32, 34 thereby moving the triangular-shaped structures 44, 46 to unobstruct the coupling ears 94, 96 so that they can be unseated and lifted from the coupling pads 22, 24. As should now be apparent, the mounting bracket assembly of the present invention allows quick removal and installation of the night vision device.

Referring again to FIGS. 2A–2D, the lockable hinge arrangement 60 generally consists of an attaching member 62 which couples the mounting bracket assembly 10 to the headmount apparatus 90, and first and second link members 64, 66 which pivotally attach the attaching member 62 to the boss 20 of the mounting bracket 12. In the embodiment shown, a thumb screw 68 having raised gripping surfaces 84 and/or a screw-driver slot 82 is provided for locking and unlocking the hinge arrangement 60. It should be understood, however, that other screw-type means can be employed for locking and unlocking the hinge arrangement 60 if desired.

In FIG. 4A, a cross-sectional view of the lockable hinge arrangement 60 of FIGS. 2A–2D is shown. As can be seen, first and second pivot pins 69 and 70, which extend through the first and second link members 64, 66, the attaching member 62 and the boss 20, are provided for articulated movement of the mounting bracket 12 relative to the attaching member 62. The attaching member 62 includes one or more threaded bores 80 for coupling the attaching member 62 to the headmount apparatus 90. Plastic spacers 72, 74, 76, and 78 are provided between the link members 64, 66, and the attaching member 62 and boss 20 to allow for smooth movement between the components of the hinge arrangement 60. The thumb screw 68 passes through the second link member 66 and threads into the first link member 64 so that when the thumb screw 68 is tightened, the first and second link members 64, 66 clamp the attaching member 62 and the boss 20 of the mounting bracket 12 together thereby locking the position of the mounting bracket 12 relative to the attaching member 62. Since the washers are made from a plastic material, they compress as the thumb screw 68 is tightened to allow the components of the hinge arrangement 60 to make surface to surface contact with each other, the friction caused by this surface to surface contact operating to prevent relative movement between the hinge components and thus, locking the position of the hinge arrangement 60. When the thumb screw 68 is loosened, the mounting bracket 12 can be articulated relative to the attaching member 62 via pivoting movement that take can be made about the pivot axis A and/or B.

In another embodiment of the present invention serrated washers (not shown) can be used in place of the plastic washers shown in FIG. 4A. In still another embodiment of the present invention, serrated surfaces (not shown) can be molded into the link members, the attaching member and the boss in the areas surrounding the pivot pins in place of the plastic washers.

Figure 4D:
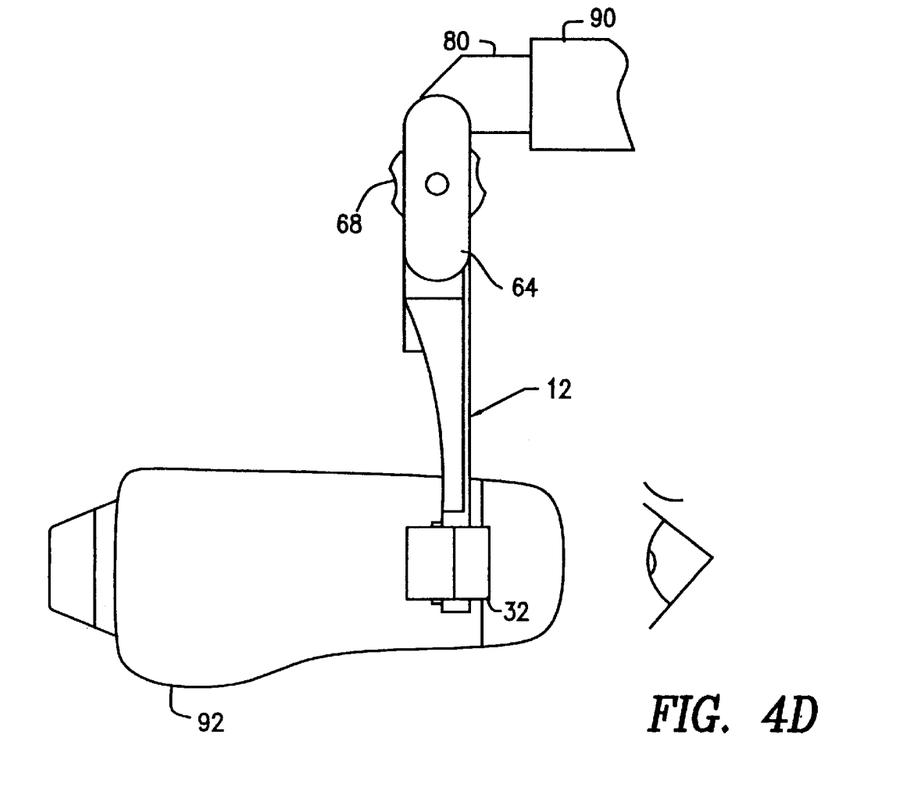

Accordingly, the night vision device 92 attached to the mounting bracket assembly 10 of the present invention can be rotated up and locked out a user's line sight as shown in FIG. 4B or rotated down in front of a user's eyes and oriented and locked in multitude of different positions due to the articulated movement provided by the hinge arrangement 60. Two possible down positions are shown for illustrative purposes in FIGS. 4C and 4D.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

What is claimed is:

1. A mounting bracket assembly for mounting a night vision device including a coupling member to a headmount apparatus, said mounting bracket assembly comprising:

an attachment member coupled to said headmount;

a generally U-shaped mounting bracket for holding said night vision device, said mounting bracket including a coupling pad disposed at an end of said mounting bracket for defining a seating surface and a key member protruding up therefrom for cooperating with said coupling member, and a spring clip attached to said coupling pad for locking the coupling member to said coupling pad; and a hinge coupling said mounting bracket to said attachment member, said hinge including pivot means for allowing articulated movement of said mounting bracket relative to said attachment member.

2. The mounting bracket assembly according to claim 1, wherein said hinge includes means for preventing said articulated movement of said mounting bracket relative to said attachment member after said mounting bracket is placed in a desired position relative to said attachment member.

3. The mounting bracket assembly according to claim 1, wherein said hinge includes a pair of link members which pivotally couple said attachment member to said mounting bracket.

4. The mounting bracket assembly according to claim 3, wherein said hinge further includes a screw for clamping said link members together to prevent said articulated movement of said mounting bracket relative to said attachment member after said mounting bracket is placed in a desired position relative to said attachment member.

5. The mounting bracket assembly according to claim 1, wherein said mounting bracket includes a second coupling pad at a second end thereof for receiving a second coupling member attached to the night vision device.

6. The mounting bracket assembly according to claim 5, wherein said second coupling pad includes a second spring clip attached thereto for locking the second coupling member of the night vision device to said second coupling pad.

7. The mounting bracket assembly according to claim 1, wherein said spring clip has a generally C-shaped profile defined by a first arm which attaches said clip to said coupling pad and an elastically resilient locking arm which locks the coupling member of the night vision device to the coupling pad.

8. A headmount apparatus for mounting a night vision device including a coupling member to a users head, said headmount apparatus comprising:

a headgear assembly; and a mounting bracket assembly comprising:

an attachment member coupled to said headgear assembly;

a generally U-shaped mounting bracket for holding said night vision device, said mounting bracket including a coupling pad disposed at an end of said mounting bracket for receiving said coupling member, said coupling pad defining a seating surface and a key member protruding up therefrom for cooperating with said coupling member, a spring clip attached to said coupling pad for locking the coupling member to said coupling pad; and, a hinge coupling said mounting bracket to said attachment member, said hinge including pivot means for allowing articulated movement of said mounting bracket relative to said headgear assembly.

9. The headmount apparatus according to claim 8, wherein said hinge includes means for preventing said articulated movement of said mounting bracket relative to said headgear assembly after said mounting bracket is placed in a desired position.

10. The headmount apparatus according to claim 8, wherein said spring clip has a generally C-shaped profile defined by a first arm which attaches said clip to said coupling pad and an elastically resilient locking arm which locks the coupling member of the night vision device to the coupling pad.

11. The headmount apparatus according to claim 8, wherein said hinge includes a pair of link members which pivotally couple said attachment member to said mounting bracket.

12. The headmount apparatus according to claim 11, wherein said hinge further includes a screw for clamping said link members together to prevent said articulated movement of said mounting bracket relative to said attachment member after said mounting bracket is placed in a desired position relative to said attachment member.

13. The headmount apparatus according to claim 8, wherein said mounting bracket includes a second coupling pad at a second end thereof for receiving a second coupling member attached to the night vision device.

14. The headmount apparatus according to claim 13, wherein said second coupling pad includes a second spring clip attached thereto for locking the second coupling member of the night vision device to said second coupling pad.

15. A headmounted night vision imaging system comprising:

a headmount assembly;

a night vision device including a coupling member;

a mounting bracket assembly comprising:

an attachment member coupled to said headmount assembly;

a generally U-shaped mounting bracket for holding said night vision device, said mounting bracket including a coupling pad disposed at an end of said mounting bracket for receiving said coupling member, said coupling pad defining a seating surface and a key member protruding up therefrom for cooperating with said coupling member, and a spring clip attached to said coupling pad for locking said coupling member of the night vision device to said coupling pad; and, a hinge coupling said mounting bracket to said attachment member, said hinge including pivot means for allowing articulated movement of said mounting bracket relative to said headmount assembly.

16. The night vision imaging system according to claim 15, wherein said hinge includes means for preventing said articulated movement of said mounting bracket relative to said headmount assembly after said mounting bracket is placed in a desired position.

17. The night vision imaging system according to claim 15, wherein said spring clip has a generally C-shaped profile defined by a first arm which attaches said clip to said coupling pad and an elastically resilient locking arm which locks the coupling member of the night vision device to the coupling pad.

18. The night vision imaging system according to claim 15, wherein said hinge includes a pair of link members which pivotally couple said attachment member to said mounting bracket.

19. The night vision imaging system according to claim 18, wherein said hinge further includes a screw for clamping said link members together to prevent said articulated movement of said mounting bracket relative to said attachment member after said mounting bracket is placed in a desired position relative to said attachment member.

\* \* \* \* \*